United States Patent
Lehr et al.

(10) Patent No.: US 8,326,893 B2
(45) Date of Patent: Dec. 4, 2012

(54) ALLOCATING DATA SETS TO A CONTAINER DATA SET

(75) Inventors: Douglas Lee Lehr, Tucson, AZ (US); Franklin Emmert McCune, Tucson, AZ (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 12/392,020

(22) Filed: Feb. 24, 2009

(65) Prior Publication Data

US 2010/0228708 A1 Sep. 9, 2010

(51) Int. Cl.
*G06F 17/30* (2006.01)
(52) U.S. Cl. ........................................ 707/812
(58) Field of Classification Search .......... 707/812; 711/203
See application file for complete search history.

(56) References Cited

U.S. PATENT DOCUMENTS

| | | | |
|---|---|---|---|
| 5,127,094 A | 6/1992 | Bono | |
| 5,794,255 A | 8/1998 | Hayashi et al. | |
| 6,192,444 B1 | 2/2001 | White et al. | |
| 6,629,111 B1 * | 9/2003 | Stine et al. | 1/1 |
| 7,386,697 B1 * | 6/2008 | Case et al. | 711/171 |
| 2002/0019907 A1 | 2/2002 | McMurdie et al. | |
| 2004/0220974 A1 | 11/2004 | Cressman | |
| 2010/0017578 A1 * | 1/2010 | Mansson et al. | 711/171 |

FOREIGN PATENT DOCUMENTS

| | | |
|---|---|---|
| EP | 0040694 A2 | 12/1981 |
| EP | 0933691 A2 | 8/1999 |
| JP | 62037754 A | 2/1987 |
| JP | 7141231 A | 6/1995 |

OTHER PUBLICATIONS

Abstract of Japanese Patent No. JP62037754A dated Feb. 18, 1987 for Fujitsu Ltd.
Abstract of Japanese Patent No. JP7141231A dated Jun. 2, 1995 for Fujitsu Ltd.

* cited by examiner

*Primary Examiner* — Rehana Perveen
*Assistant Examiner* — Alexander Khong
(74) *Attorney, Agent, or Firm* — David W. Victor; Konrad Raynes & Victor LLP (57) ABSTRACT

Provided are a method, system, and program for allocating data sets to a container data set. A container data set is allocated in a storage system. An entry is included in a file allocation catalog for the allocated container data set indicating an address range of data allocated to the container data set, wherein the file allocation catalog maps data sets to address ranges in the storage system. A virtual file allocation catalog for the container data set is generated. A request is received to allocate a data set. A determination is made as to whether the data set to allocate has a size less than a threshold size. An entry is included in the virtual file allocation catalog to allocate the data set in the address range of the container data set in response to determining that the data set to allocate size is less than the threshold size.

23 Claims, 6 Drawing Sheets

ALLOCATING DATA SETS TO A CONTAINER DATA SET

BACKGROUND OF THE INVENTION

1. Field of the Invention

The present invention relates to a method, system, and article of manufacture for allocating data sets to a container data set.

2. Description of the Related Art

In certain computing environments, multiple host systems may communicate with a control unit (CU) (also known as a storage controller, storage subsystem, enterprise storage server, etc.) providing access to storage devices, such as interconnected hard disk drives through one or more logical paths. The interconnected drives may be configured as a Direct Access Storage Device (DASD), Redundant Array of Independent Disks (RAID), Just a Bunch of Disks (JBOD), etc. The control unit may configure one or more logical subsystems (LSSs), where each LSS is configured to include multiple volumes.

The host systems include operating systems, middleware (such as databases) and applications that translate data requests from applications into an address that may be presented to the control unit. The control unit translates the received address into a physical location on a storage device from which to access the requested data. For instance, in certain environments, the host operating system presents an address having a cylinder number, track number, and record number in a specific format.

Certain operating systems allow the host operating system in coordination with the control unit to allocate any size data sets in a first portion of an address space of the storage, but data sets allocated in a second portion of the address space must be allocated a minimum file allocation size, even if the data set being allocated contains substantially less data than the minimum file allocation size, resulting in unused storage space allocated to the data set.

There is a need in the art for improved techniques for allocating data sets in an address space.

SUMMARY

Provided are a method, system, and program for allocating data sets to a container data set. A container data set is allocated in a storage system. An entry is included in a file allocation catalog for the allocated container data set indicating an address range of data allocated to the container data set, wherein the file allocation catalog maps data sets to address ranges in the storage system. A virtual file allocation catalog for the container data set is generated. A request is received to allocate a data set. A determination is made as to whether the data set to allocate has a size less than a threshold size. An entry is included in the virtual file allocation catalog to allocate the data set in the address range of the container data set in response to determining that the data set to allocate size is less than the threshold size.

DETAILED DESCRIPTION

Figure 1:
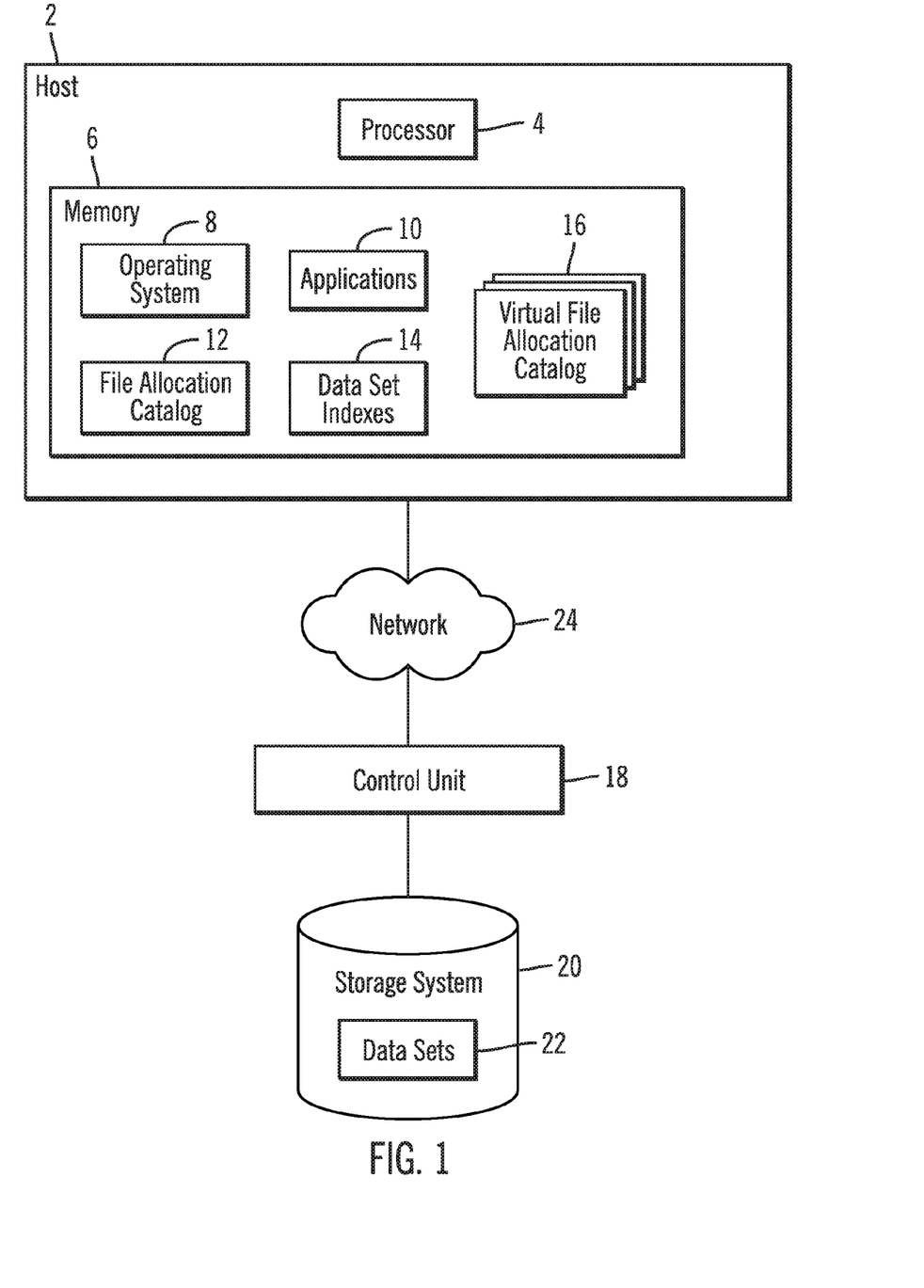
FIG. 1 illustrates an embodiment of a computing environment.

FIG. 1 illustrates an embodiment of a computing environment. A host 2 includes a processor 4, which may comprise one or more processors, and a memory 6 including programs, such as an operating system 8 and application 10, and data structures, such as file allocation catalog 12, data set indexes 14, and virtual file allocation catalogs 16. The memory 6 may comprise one or more volatile memory devices, such as an on-board cache memory and/or a type of Random Access Memory (RAM). The one or more applications 10 submit data requests to the operating system 8 that are sent to a control unit 18 that manages access to a storage system 20 in which data sets 22 are stored. A data set comprises a collection of data intended to be stored in a same logical allocation of data, such as data from a single application, user, enterprise, etc. A data set may be comprised of separate files or records, or comprise a single file or record. The host 2 and control unit 18 may communicate over a network 24. The storage system 20 is addressed using addresses that form an address space. The control unit 18 translates the address provided from the host operating systems 8 into a physical location in the storage 20 to access.

The host 2 may comprise a computational device known in the art, such as a workstation, mainframe, server, etc. The control unit 18 may comprise a storage subsystem or server, such as an enterprise storage server, storage controller, etc., or other device used to manage I/O requests to attached volumes. The storage system 20 may comprise storage devices known in the art, such as interconnected hard disk drives (e.g., configured as a DASD, RAID, JBOD, virtualized devices, etc.), magnetic tape, electronic memory, flash memory, optical disk, etc. The network 24 may comprise a Local Area Network (LAN), Storage Area Network (SAN), Wide Area Network (WAN), peer-to-peer network, wireless network, etc. Alternatively, the host 2 may communicate with the control unit 18 over a bus interface, such as a Peripheral Component Interconnect (PCI) bus or serial interface. The operating system 8 may comprise suitable operating systems known in the art, such as the International Business Machines ("IBM®") z/OS® operating system. (IBM and z/OS are trademarks of IBM in the United States and foreign countries).

The operating system 8 receives data requests from the applications 10 for data The applications 6 may include middleware, access methods, and independent software vendor (ISV) products. In one embodiment, the operating systems 8 may communicate Input/Output (I/O) requests to the control unit 18 through a channel subsystem in the host 2 that provides a plurality of logical paths to the control unit 18.

The operating system 8 may maintain a file allocation catalog 12 providing information on the allocation of the data sets 22 to storage 20. In one embodiment, the file allocation catalog 12 may comprise a volume table of contents (VTOC) providing information on each data set 22 defined in the storage 20, including the extents of storage locations assigned to each defined data set. The data sets 22 may comprise indexed data sets that are indexed according to a primary key that is used to locate records in the data set 22. Data set indexes 14 provide an index for each indexed data set 22. For instance, the data set may comprise a Key Sequenced Data Set (KSDS) used in the IBM Virtual Storage Access Method (VSAM) storage, where each record in the KSDS data set has a unique key used to locate the record in the data set 22. The operating system 8 may further maintain a virtual file allocation catalog 16 for a data set 22 that comprises a container data set to store smaller data sets. In certain embodiment, the container data set is identified in the file allocation catalog 12 and the data sets included in the address range of the container data set have entries in the virtual file allocation catalog 16, which may have the same format as the file allocation catalog 12, but provide information on data sets having address ranges in the container data set.

In certain architectures, the operating system may impose an architectural limit to restrict smaller data sets, those below a threshold size, to a first portion of the storage address space. Once the first portion of the storage address range is allocated to data sets, only data sets with a minimum allocation size can be allocated to a second portion of the address space, even if the data set allocated in the second portion of the address space will not use the minimum allocation size. In certain embodiments, these smaller data sets may be allocated to address ranges within an address range of a container data set having a virtual file allocation catalog 16 allocated addresses in the second portion of the address space.

Figure 2:
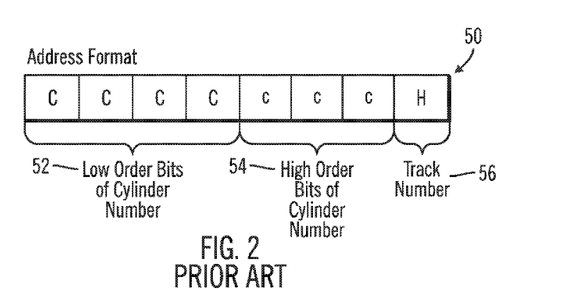
FIG. 2 illustrates an embodiment of an address format known in the prior art.

FIG. 2 illustrates an address format 50 CCCCcccH used by the operating system 8, which is known in the prior art. Bytes "CCCC" 52 are used to form the low order bits of a cylinder number or first number portion of the address space and the "ccc" 54 bytes forms the most significant bits of the cylinder number. Each "c" may comprise a four bit nibble, so "ccc" is three nibbles or 12 bits. The track number comprises nibble (or bits) 56. The operating system 8 presents the address in the address format 50 to the control unit 18 to use to translate to a physical location in the storage system 20. A data set 22 may comprise a range of addresses.

Figure 3:
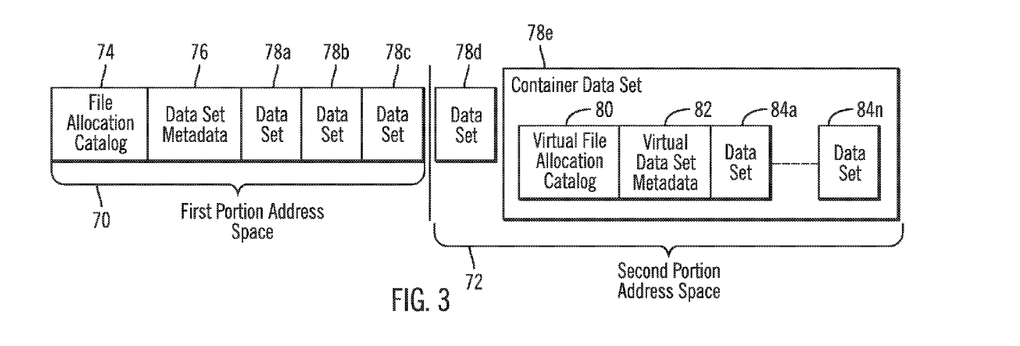
FIG. 3 illustrates an embodiment of how data sets are allocated in an address space.

FIG. 3 illustrates an example illustrating how the operating system 8 defines data sets and other information allocated in the storage 22 address space. The storage address space 22 may be divided into a first 70 and second 72 portions of the address space of available addresses to use to access the storage system 20. For instance, the first portion 70 may comprise addresses within the first 65,520 cylinders and the second portion 72 may comprise addresses having cylinder address portions above the 65,520$^{th}$ cylinder. In certain embodiments, data sets in the second portion may have a minimum allocation size, such as 21 cylinders. A first portion of the address space includes the file allocation catalog 74, such as file allocation catalog 12, and data set metadata 76 providing entries for information on the data sets 78a, 78b, 78c, 78d, and 78e allocated in the first 70 and second 72 portions of the address space. The data set metadata 76 may provide information on the data sets 78a, 78b, 78c, 78d, and 78e, such as the compression used for the data set, striping or writing technique, etc. In one embodiment, the data set metadata 76 may comprise the IBM VSAM Volume Data Set (VVDS) providing extent descriptors for the data sets 78a . . . 78e.

Data set 78e comprises a container data set having a virtual file allocation catalog 80, such as the virtual file allocation catalog 16, and virtual data set metadata 82 providing information on data sets 84a . . . 84n allocated within the address range of the container data set 78e, as indicated in the file allocation table 74. There may be multiple container data sets allocated.

Figure 4:
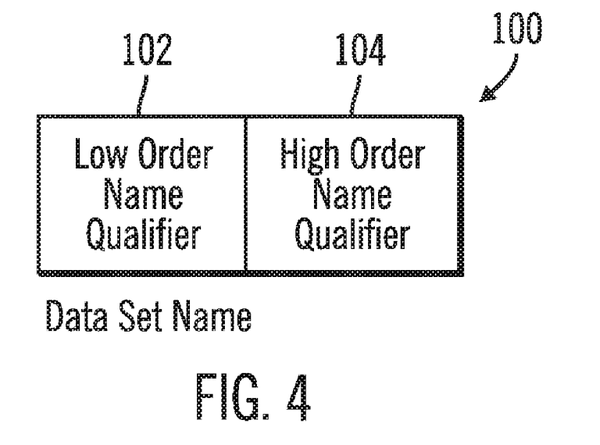
FIG. 4 illustrates an embodiment of a format of a data set name.

FIG. 4 illustrates an embodiment of a data set name 100 having a low order name qualifier 102 and high order name qualifier 104. In one embodiment, data sets 84a . . . 84n included in a container data set 78e may share the same high order name qualifier 104, but have different low order name qualifiers 102. In embodiments using the address format of FIG. 2, the low order name qualifier 102 may comprise the low order bits 52 of the cylinder number and the high order name qualifier 104 may comprise the higher order bits 54 of the cylinder number.

Figure 5:
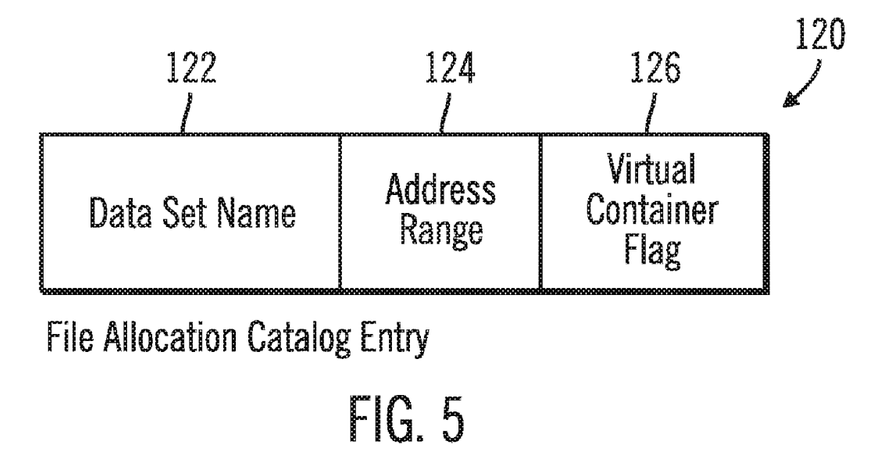
FIG. 5 illustrates an embodiment of a file allocation catalog entry.

FIG. 5 illustrates an embodiment of a file allocation catalog entry 120 that may be included in the file allocation catalog 12 or virtual file allocation catalog 16. The data set name 122 may comprise the name of the data set for which the entry 120 was generated. In one embodiment, for container data sets, e.g., 78e, the data set name may comprise the high order bits 104 of the name, where data sets 84a . . . 84n contained within a container data set 78a may have the same high order bits 104 of the container data set name. The entry 120 in the virtual file allocation catalog 80 may include the full name of the data sets 84a . . . 84n or the lower order bits 102 of the name, to distinguish the names of data sets within a container data set having the same high order bits. The address range 124 comprises a range of addresses allocated to the data set and a virtual container flag 126 indicates whether the data set identified in the entry 120 in the file allocation catalog 12 comprises a container data set.

Figure 6:
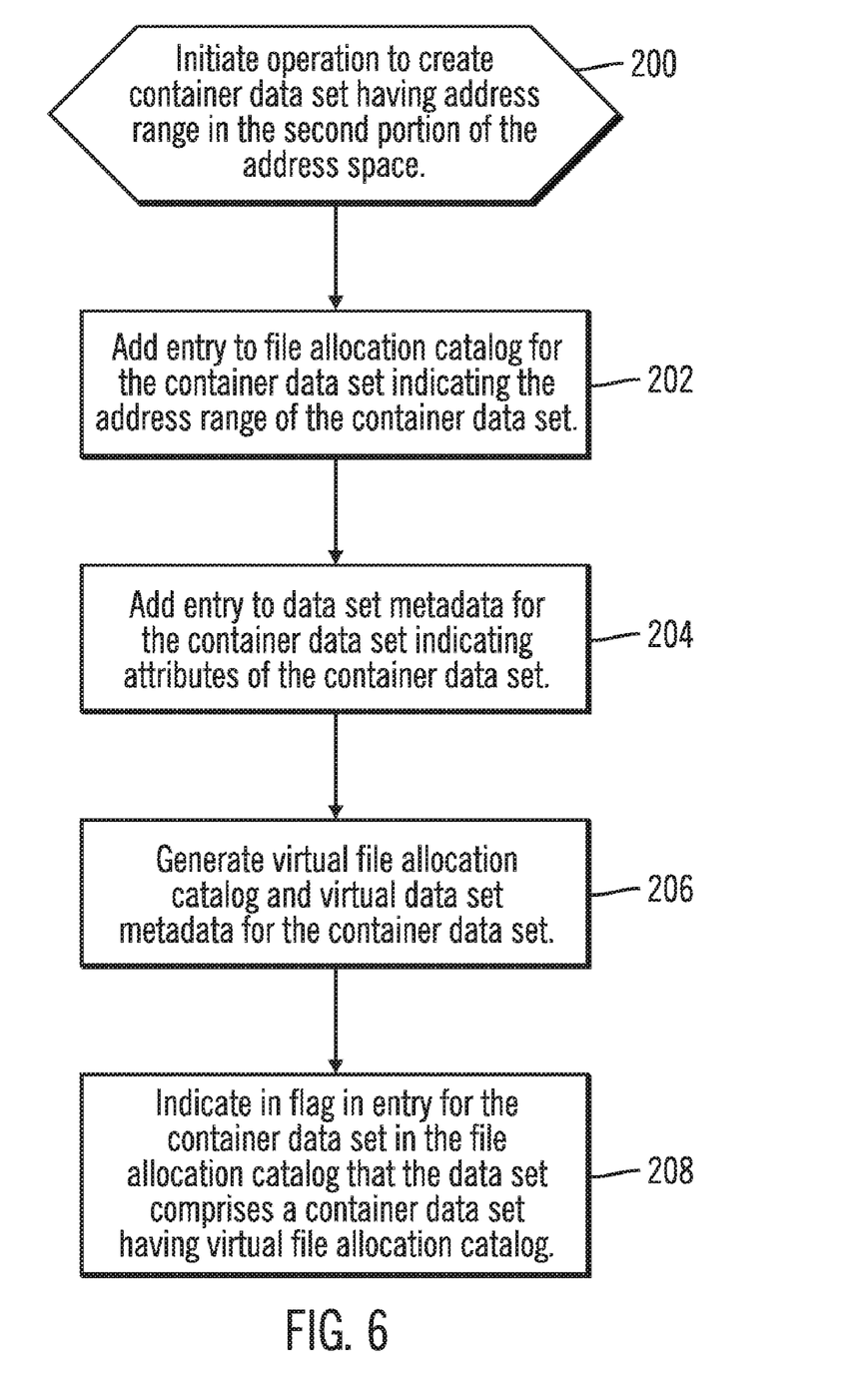
FIG. 6 illustrates an embodiment of operations to create a container data set.

FIG. 6 illustrates an embodiment of operations performed by the operating system 8 to create a container data set 78e (FIG. 3). Upon initiating (at block 200) operations to create a container data set 78e having an address range in the second portion of the address space, the operating system 8 adds (at block 202) an entry 120 (FIG. 5) to the file allocation catalog 12 or 74 for the container data set 78e indicating the address range of the container data set 78e. The operating system 8 further adds (at block 204) an entry to the data set metadata 76 for the container data set 78e indicating attributes of the container data set 78e. The operating system 8 generates (at block 206) a virtual file allocation catalog 80 and virtual data set metadata 82 for the container data set 78e and indicates (at block 208) in a flag (the virtual container flag 126) for the container data set 78e in the file allocation catalog 74 that the data set comprises a container data set having a virtual file allocation catalog for data sets stored therein.

Figure 7:
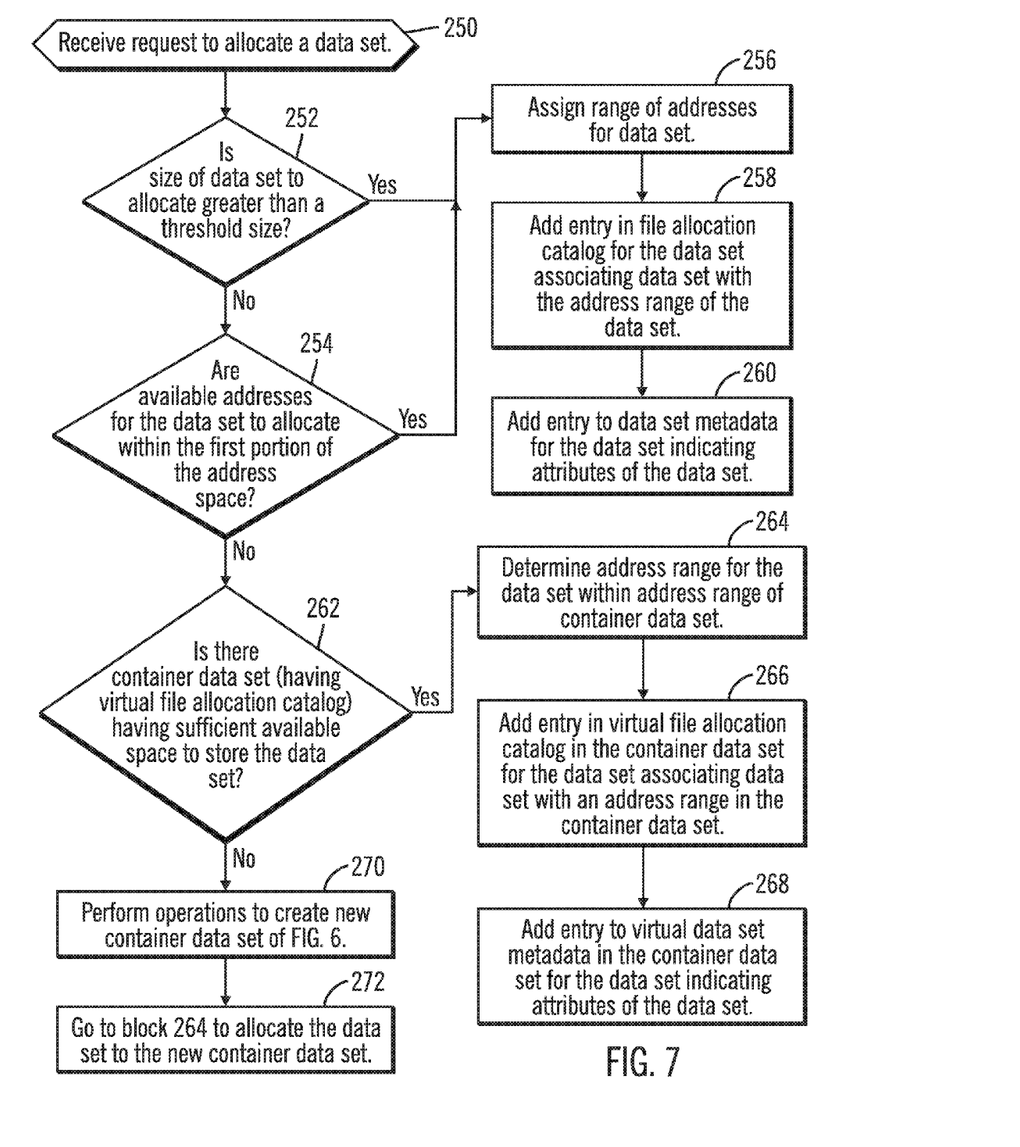
FIG. 7 illustrates an embodiment of operations to allocate a data set.

FIG. 7 illustrates an embodiment of operations performed by the operating system 8 to process a request to allocate a data set 78a . . . 78e. In response to a request (at bock 200) to allocate a data set, the operating system 8 determines (at block 252) whether a size of the data set to allocate is greater than a threshold size. In one embodiment, the threshold size may comprise the minimum file allocation size for data sets in the second portion of the address range or some other value. If (at block 252) the data set to allocate is not greater than the threshold size, i.e., the data set to allocate is a small data set, and if (at block 254) there are not sufficient available addresses in the first portion of the address space for the small data set to add, then the operating system 8 assigns (at block 256) a range of addresses for the data set and adds (at block 258) an entry 120 in the file allocation catalog 74 for the data set associating the data set with the address range. An entry of the data set is also added to the metadata 76 indicating attributes of the added data set. Control also proceeds to block 256 if the size of the data set to allocate is greater than the threshold size.

If (at block 252) the size of the data set is not greater than the threshold size, i.e., small data set, and if (at block 254) there are not enough available addresses in the first portion of the address space, then the operating system 8 determines (at 262) whether there is an allocated container data set 78e having sufficient available space to store the data. If the container data set 78e has sufficient available space for the small data set to allocate, then the operating system 8 set determines (at block 264) an address range for the data set to allocate within address range of the container data set 78e. The operating system 8 adds (at block 266) an entry 120 in the virtual file allocation catalog 80 in the container data set 78e for the data set to allocate associating data set with an address range in the container data set 78e, which is indicated in the address range field 124 of the entry 120. The operating system 8 further adds (at block 268) an entry to the virtual data set metadata 82 in the container data set 78e for the data set indicating attributes of the data set. If the container data set 78e comprises an indexed data set, then an entry may be added to the index for the data set on the data set added. If (at block 262) there is not an allocated container data set having sufficient space for the data set to allocate, then the operating system 8 may create (at block 270) a new container data set by performing the operations of FIG. 6. Control may then proceed (at block 272) to block 264 to allocate the small data set to the new container data set.

Figure 8:
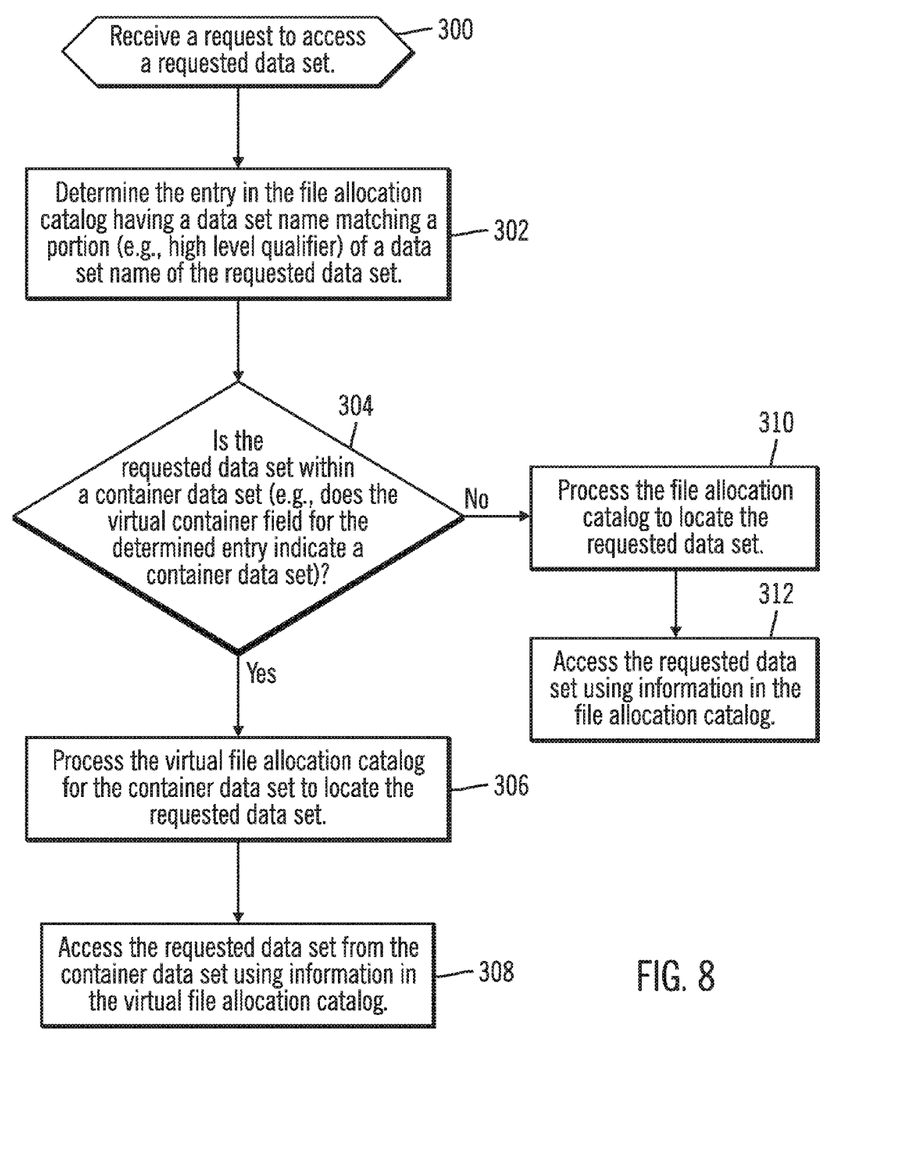
FIG. 8 illustrates an embodiment of operations to access a data set.

FIG. 8 illustrates an embodiment of operations performed by the operating system 8 to process a request to access a data set. Upon receiving (at block 300) a request for a requested data set, the operating system 8 determines (at block 302) the entry 120 in the file allocation catalog 74 having a data set name matching a portion (e.g., high order name qualifier 104) of a data set name 100 (FIG. 4) of the requested data set. If (at block 304) the requested data set is within a container data set 78e, e.g., data sets 84a . . . 84n, such as if the virtual container flag 126 is set to indicate the entry 120 is for a container data set, then the operating system 8 processes (at block 306) the virtual file allocation catalog 80 for the container data set to locate the requested data set and accesses (at block 308) the requested data set 84a . . . 84n from the container data set 78e using information in the virtual file allocation catalog 80. If (at block 304) the requested data set is not within a container data set 78e, such as data sets 78a . . . 78d, then the operating system 8 processes (at block 310) the file allocation catalog 74 to locate the requested data set 78a . . . 78d and accesses (at block 312) the requested data set using information in the file allocation catalog 74.

In embodiments where the data set being 84a . . . 84n accessed is within a container data set 78e and the container data set comprises an indexed data set, then the index of the container data set may be used to locate the data set within the container. With the described embodiments, a container data set is used to allocate data sets less than a threshold size when the available addresses are in a portion of the address space having a minimum allocation size. Container data sets may be used in portions of the address space having a minimum allocation size when the data set size is small or less than a threshold size. This avoids having to allocate the full minimum data set allocation size to a smaller data set.

Additional Embodiment Details

The described operations may be implemented as a method, apparatus or article of manufacture using standard programming and/or engineering techniques to comprise or operate a process or system. The described operations may be implemented as code maintained in a "computer readable storage medium", where a processor may read and execute the code from the computer storage readable medium. A computer readable storage medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). An "article of manufacture" comprises a computer readable storage medium, hardware device, and/or transmission transmitters or receivers in which code or logic may be implemented. Those skilled in the art will recognize that many modifications may be made to this configuration without departing from the scope of the present invention, and that the article of manufacture may comprise suitable information bearing medium known in the art.

The described file allocation and access operations are described as performed by an operating system. In alternative embodiments, the may be performed by other program components in the host 2.

In the described embodiments, the virtual file allocation catalog and virtual data set metadata is contained within the container data set. In alternative embodiments, the virtual file allocation catalog and virtual data set metadata may be maintained at a location external to the container data set.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The use of variable references, such as "n" or "m", etc., to denote a number of instances of an item may refer to any integer number of instances of the item, where different variables may comprise the same number or different numbers. Further, a same variable reference used with different elements may denote a same or different number of instances of those elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 6, 7, and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method executed in a computer system to manage the storage of data in a storage system, comprising:
   allocating a container data set in the storage system;
   including an entry in a file allocation catalog for the allocated container data set indicating an address range of data allocated to the container data set, wherein the file allocation catalog maps data sets to address ranges in the storage system;
   generating a virtual file allocation catalog for the container data set, wherein the virtual file allocation catalog includes entries for data sets allocated in the address range of the container data set;
   receiving a request to allocate a data set;
   determining whether the data set to allocate has a size less than a threshold size;
   including an entry in the virtual file allocation catalog to allocate the data set in the address range of the container data set in response to determining that the data set to allocate size is less than the threshold size; and
   including an entry in the file allocation catalog to allocate the data set in response to determining that the data set to allocate size is greater than the threshold size.

2. The method of claim 1, further comprising:
   receiving a request to access a requested data set;
   determining whether the requested data set is included in the container data set; and
   processing the virtual file allocation catalog to locate the requested data set in response to determining that the requested data set is contained in the container data set.

3. The method of claim 2, further comprising:
   providing a flag in the file allocation catalog indicating for each data set whether the data set comprises the container data set having the virtual allocation catalog,
   wherein determining whether the requested data set is included in the container data set comprises:
      determining the entry in the file allocation catalog having a data set name matching a portion of a data set name of the requested data set; and
      determining from the flag for the determined entry whether the data set associated with the determined entry comprises the container data set for which the virtual file allocation catalog is provided.

4. The method of claim 1, wherein the data sets indicated in the virtual file allocation catalog and having the address range contained in the address range of the container data set are not indicated in the file allocation catalog in which the container data set is indicated.

5. The method of claim 1, wherein an entry is added to the file allocation catalog for data sets assigned an address range within a first portion of an address space in which addresses are allocated regardless of whether the data set size is less than the threshold size, wherein an entry is added to the virtual file allocation catalog for data sets assigned an address range within a second portion of the address space when the data set size is less than the threshold.

6. The method of claim 5, wherein the entry is added to the file allocation catalog for data sets assigned the address range in the second portion of the address space beyond when the data set size is greater than the threshold.

7. The method of claim 1, wherein data set metadata is maintained for data sets, including the container data set, allocated in the file allocation catalog indicating attributes of the data set, and wherein virtual data set metadata is maintained for data sets allocated in the virtual allocation catalog indicating attributes of data sets included in the container data set.

8. The method of claim 1, wherein the container data set comprises an indexed data set having an index file, wherein the data set names of the data sets allocated in the address range of the container data set and indicated in the virtual file allocation catalog are used as key values to locate the data set in the container data set using the index file.

9. A system in communication with a storage system, comprising:
   a processor; and
   a computer readable storage medium including a computer program executed by the processor to perform operations, the operating comprising:
      allocating a container data set in the storage system;
      including an entry in a file allocation catalog for the allocated container data set indicating an address range of data allocated to the container data set, wherein the file allocation catalog maps data sets to address ranges in the storage system;
      generating a virtual file allocation catalog for the container data set, wherein the virtual file allocation catalog includes entries for data sets allocated in the address range of the container data set;
      receiving a request to allocate a data set;
      determining whether the data set to allocate has a size less than a threshold size;
      including an entry in the virtual file allocation catalog to allocate the data set in the address range of the container data set in response to determining that the data set to allocate size is less than the threshold size; and
including an entry in the file allocation catalog to allocate the data set in response to determining that the data set to allocate size is greater than the threshold size.

10. The system of claim 9, wherein the operations further comprise:
receiving a request to access a requested data set;
determining whether the requested data set is included in the container data set; and
processing the virtual file allocation catalog to locate the requested data set in response to determining that the requested data set is contained in the container data set.

11. The system of claim 10, wherein the operations further comprise:
providing a flag in the file allocation catalog indicating for each data set whether the data set comprises the container data set having the virtual allocation catalog,
wherein determining whether the requested data set is included in the container data set comprises:
determining the entry in the file allocation catalog having a data set name matching a portion of a data set name of the requested data set; and
determining from the flag for the determined entry whether the data set associated with the determined entry comprises the container data set for which the virtual file allocation catalog is provided.

12. The system of claim 9, wherein an entry is added to the file allocation catalog for data sets assigned an address range within a first portion of an address space in which addresses are allocated regardless of whether the data set size is less than the threshold size, wherein an entry is added to the virtual file allocation catalog for data sets assigned an address range within a second portion of the address space when the data set size is less than the threshold.

13. An article of manufacture comprising a computer readable storage medium having code to communicate with a storage system and perform operations, the operations comprising:
allocating a container data set in the storage system;
including an entry in a file allocation catalog for the allocated container data set indicating an address range of data allocated to the container data set, wherein the file allocation catalog maps data sets to address ranges in the storage system;
generating a virtual file allocation catalog for the container data set, wherein the virtual file allocation catalog includes entries for data sets allocated in the address range of the container data set;
receiving a request to allocate a data set;
determining whether the data set to allocate has a size less than a threshold size;
including an entry in the virtual file allocation catalog to allocate the data set in the address range of the container data set in response to determining that the data set to allocate size is less than the threshold size; and
including an entry in the file allocation catalog to allocate the data set in response to determining that the data set to allocate size is greater than the threshold size.

14. The article of manufacture of claim 13, wherein the operations further comprise:
receiving a request to access a requested data set;
determining whether the requested data set is included in the container data set; and
processing the virtual file allocation catalog to locate the requested data set in response to determining that the requested data set is contained in the container data set.

15. The article of manufacture of claim 14, wherein the operations further comprise:
providing a flag in the file allocation catalog indicating for each data set whether the data set comprises the container data set having the virtual allocation catalog,
wherein determining whether the requested data set is included in the container data set comprises:
determining the entry in the file allocation catalog having a data set name matching a portion of a data set name of the requested data set; and
determining from the flag for the determined entry whether the data set associated with the determined entry comprises the container data set for which the virtual file allocation catalog is provided.

16. The article of manufacture of claim 13, wherein the data sets indicated in the virtual file allocation catalog and having the address range contained in the address range of the container data set are not indicated in the file allocation catalog in which the container data set is indicated.

17. The article of manufacture of claim 13, wherein an entry is added to the file allocation catalog for data sets assigned an address range within a first portion of an address space in which addresses are allocated regardless of whether the data set size is less than the threshold size, wherein an entry is added to the virtual file allocation catalog for data sets assigned an address range within a second portion of the address space when the data set size is less than the threshold.

18. The article of manufacture of claim 17, wherein the entry is added to the file allocation catalog for data sets assigned the address range in the second portion of the address space beyond when the data set size is greater than the threshold.

19. The article of manufacture of claim 13, wherein data set metadata is maintained for data sets, including the container data set, allocated in the file allocation catalog indicating attributes of the data set, and wherein virtual data set metadata is maintained for data sets allocated in the virtual allocation catalog indicating attributes of data sets included in the container data set.

20. The article of manufacture of claim 13, wherein the container data set comprises an indexed data set having an index file, wherein the data set names of the data sets allocated in the address range of the container data set and indicated in the virtual file allocation catalog are used as key values to locate the data set in the container data set using the index file.

21. The method of claim 1, further comprising:
allocating a plurality of container data sets in the storage system;
including at least one data set in the container data sets;
including an entry in the file allocation catalog for each allocated container data set; and
generating a virtual file allocation catalog for each container data set to include entries for the data sets included in the container data sets.

22. The system of claim 9, wherein the operations further comprise:
allocating a plurality of container data sets in the storage system;
including at least one data set in the container data sets;
including an entry in the file allocation catalog for each allocated container data set; and
generating a virtual file allocation catalog for each container data set to include entries for the data sets included in the container data sets.

23. The article of manufacture of claim 13, wherein the operations further comprise:
- allocating a plurality of container data sets in the storage system;
- including at least one data set in the container data sets;
- including an entry in the file allocation catalog for each allocated container data set; and
- generating a virtual file allocation catalog for each container data set to include entries for the data sets included in the container data sets.

* * * * *